(12) United States Patent
Hodges et al.

(10) Patent No.: US 8,269,746 B2
(45) Date of Patent: Sep. 18, 2012

(54) COMMUNICATION WITH A TOUCH SCREEN

(75) Inventors: Stephen Hodges, Cambridge (GB);
Shahram Izadi, Cambridge (GB); David Alexander Butler, Cambridge (GB);
Alban Rrustemi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/693,670

(22) Filed: Mar. 29, 2007

(65) Prior Publication Data

US 2008/0122792 A1    May 29, 2008

Related U.S. Application Data

(63) Continuation-in-part of application No. 11/604,491, filed on Nov. 27, 2006.

(51) Int. Cl.
*G06F 3/042* (2006.01)

(52) U.S. Cl. ........ 345/175; 345/173; 345/158; 345/179; 345/156; 345/104; 715/761; 715/764; 715/753; 356/498; 178/18.09; 178/19.05

(58) Field of Classification Search .......... 345/156–158, 345/173, 175, 176, 177, 179, 104; 178/18.01–19.04, 178/19.05; 715/702, 740, 753, 761, 764; 463/37; 356/498
See application file for complete search history.

(56) References Cited

U.S. PATENT DOCUMENTS

| | | | |
|---|---|---|---|
| 4,710,760 A | 12/1987 | Kasday | |
| 4,782,328 A | 11/1988 | Denlinger | |
| 5,007,085 A * | 4/1991 | Greanias et al. | 726/34 |
| 5,442,376 A | 8/1995 | Tannenbaum et al. | |
| 5,543,591 A | 8/1996 | Gillespie et al. | |
| 5,584,552 A | 12/1996 | Nam-Su et al. | |
| 5,594,810 A * | 1/1997 | Gourdol | 382/187 |
| 5,729,251 A * | 3/1998 | Nakashima | 709/250 |
| 5,764,223 A | 6/1998 | Chang et al. | |
| 5,784,060 A * | 7/1998 | Bertram et al. | 715/840 |
| 5,825,352 A | 10/1998 | Bisset et al. | |
| 5,835,078 A * | 11/1998 | Arita et al. | 345/158 |
| 5,929,432 A | 7/1999 | Yamakawa | |
| 6,002,387 A * | 12/1999 | Ronkka et al. | 345/157 |
| 6,023,265 A | 2/2000 | Lee | |
| 6,229,529 B1 | 5/2001 | Yano et al. | |
| 6,324,310 B1 | 11/2001 | Brownlee | |
| 6,538,644 B1 | 3/2003 | Muraoka | |

(Continued)

FOREIGN PATENT DOCUMENTS

GB    2315594    2/1998

(Continued)

OTHER PUBLICATIONS

Matsushita and Rekimoto, "HoloWall: Designing a Finger, Hand, Body, and Object Sensitive Wall", 1997, UIST 97, Banff, Alberta, Canada, pp. 209-210.*

(Continued)

*Primary Examiner* — Lun-Yi Lao
*Assistant Examiner* — Kelly B Hegarty
(74) *Attorney, Agent, or Firm* — Lee & Hayes, PLLC

(57) ABSTRACT

A touch panel is arranged to enable communication using infrared signals with nearby devices. The touch panel includes an array of infrared sensors, arranged parallel to the touchable surface of the panel and at least one of the sensors is capable of detecting an infrared signal received from a nearby device.

10 Claims, 10 Drawing Sheets

U.S. PATENT DOCUMENTS

| | | | |
|---|---|---|---|
| 6,747,290 | B2 | 6/2004 | Yamazaki et al. |
| 6,856,259 | B1 | 2/2005 | Sharp |
| 6,879,319 | B2 | 4/2005 | Cok |
| 6,888,536 | B2 | 5/2005 | Westerman et al. |
| 6,995,743 | B2 | 2/2006 | Boer et al. |
| 6,995,752 | B2 | 2/2006 | Lu |
| 7,009,663 | B2 | 3/2006 | Abileah et al. |
| 7,050,048 | B2 | 5/2006 | Ito |
| 7,053,967 | B2 | 5/2006 | Abileah et al. |
| 7,158,118 | B2* | 1/2007 | Liberty .................. 345/158 |
| 7,173,604 | B2* | 2/2007 | Marvit et al. ............ 345/156 |
| 7,360,708 | B2* | 4/2008 | Miyake et al. ........ 235/472.01 |
| 7,365,736 | B2* | 4/2008 | Marvit et al. ............ 345/156 |
| 7,548,230 | B2* | 6/2009 | Corson .................. 345/158 |
| 7,584,432 | B1* | 9/2009 | Oakley et al. ............ 715/761 |
| 7,646,379 | B1* | 1/2010 | Drennan et al. ......... 345/177 |
| 7,764,274 | B2* | 7/2010 | Westerman et al. ...... 345/173 |
| 2002/0050983 | A1* | 5/2002 | Liu et al. ............... 345/173 |
| 2003/0103030 | A1 | 6/2003 | Wu |
| 2003/0107748 | A1* | 6/2003 | Lee ........................ 356/614 |
| 2003/0137494 | A1 | 7/2003 | Tulbert |
| 2004/0263482 | A1 | 12/2004 | Goertz |
| 2005/0134751 | A1 | 6/2005 | Abileah et al. |
| 2005/0162381 | A1 | 7/2005 | Bell et al. |
| 2005/0200293 | A1* | 9/2005 | Naugler et al. ........... 315/149 |
| 2005/0219204 | A1* | 10/2005 | Huddleston et al. ....... 345/156 |
| 2005/0225546 | A1 | 10/2005 | Akimoto |
| 2005/0226505 | A1 | 10/2005 | Wilson |
| 2005/0230609 | A1* | 10/2005 | Randall .................. 250/234 |
| 2005/0236481 | A1 | 10/2005 | Gascoyne et al. |
| 2005/0259266 | A1* | 11/2005 | Seko ..................... 356/498 |
| 2006/0007248 | A1 | 1/2006 | Reddy et al. |
| 2006/0145365 | A1 | 7/2006 | Halls et al. |
| 2006/0146038 | A1 | 7/2006 | Park et al. |
| 2006/0227120 | A1* | 10/2006 | Eikman .................. 345/175 |
| 2006/0244693 | A1 | 11/2006 | Yamaguchi et al. |
| 2006/0279690 | A1 | 12/2006 | Yu et al. |
| 2006/0284857 | A1 | 12/2006 | Oh |
| 2007/0113207 | A1* | 5/2007 | Gritton .................. 715/863 |
| 2007/0273670 | A1* | 11/2007 | Nordahl ................. 345/173 |
| 2008/0122792 | A1 | 5/2008 | Izadi et al. |
| 2008/0122803 | A1 | 5/2008 | Izadi et al. |
| 2008/0150913 | A1* | 6/2008 | Bell et al. ............... 345/175 |
| 2008/0198138 | A1* | 8/2008 | McFarlane et al. ........ 345/173 |
| 2009/0021488 | A1 | 1/2009 | Kali et al. |

FOREIGN PATENT DOCUMENTS

| | | |
|---|---|---|
| KR | 20030028973 | 4/2003 |
| KR | 20050073631 A | 7/2005 |

OTHER PUBLICATIONS

"Fastcompany.com", retrieved on Mar. 23, 2007, at <<http://fastcompany.com/video/general/perceptivepixel.html >>, Mansueto Ventures LLC., 2007, pp. 1.

Han, "Multi-Touch Interaction Research", retrieved on Mar. 3, 2007, at <<http://cs.nyu.edu/~jhan/ftirtouch/index.html>>, Jeff Han, 2006, pp. 4.

Hinckley, et al., "Touch-Sensing Input Devices", available at least as early as Mar. 12, 2007, at <<http://www.cs.ubc.ca/labs/spin/publications/related/hinckley99.pdf, ACM, 1999, pp. 223-230.

Marino, et al., "Programming for Multiple Touches and Multiple Users: A Toolkit for the DiamondTouch Hardware", available at least as early as Mar. 12, 2007, at <<http://grouplab.cpsc.ucalgary.ca/papers/2003/03-DiamondTouch.UISTDemo/03-DiamondTouch-UISTDemo.pdf>>, ACM, 2003, pp. 2.

"Multi-Touch Sensing through Frustrated Total Internal Reflection", retrieved on Mar. 3, 2007, at <<http://cs.nyu.edu/~jhan/ftirsense/index.html>>, ACM, 2005, pp. 2.

"Mutli-Touch Sensing through LED Matrix Displays", retrieved on Mar. 3, 2007, at <<http://cs.nyu.edu/~jhan/ledtouch/index.html >>.

Paradiso, "Several Sensor Approaches that Retrofit Large Surfaces for Interactivity", ACM, 2002, pp. 8.

Rekimoto, "SmartSkin: An Infrastructure for Freehand Manipulation on Interactive Surfaces", available at least as early Mar. 12, 2007, at <<http://delivery.acm.org/10.1145/510000/503397/p113-rekimoto.pdf? key1=503397&key2=5112863711&coll=GUIDE&dl=GUIDE&CFID=13417221&CFTOKEN=15136912>>, ACM, vol. 4, No. 1, 2002, pp. 113-120.

"Touch Panel", retrieved on Mar. 3, 2007, at <<7. http://en.wikipedia.org/wiki/Touch_panel >>, Wikimedia Foundation, Inc., 2007, pp. 2.

PCT International Search Report dated Aug. 11, 2008 from corresponding PCT Application No. PCT/US2008/058805, 3 pages.

Abileah et al., "Integrated Optical Touch Panel in a 14.1 AMLCD", Date: May 2003, vol. 35, Issue: 1, 1 page, accessible at http://scitation.aip.org/getabs/servlet/GetabsServlet?

Albinsson et ai., "High Precision Touch Screen Interaction", Date: Apr. 5-10, 2003, p. 105-112, vol. No. 5, Issue No. 1, Ft. Lauderdale, FR, accessible at http://delivery.acm.org/10.1145/650000/642631/p105-albinsson.pdf?key1 =642631&key2=2760516511&coli=portal&di=GUIDE&CFID=547568&CFTOKEN=88.

Boer et al., "Active Matrix LCD with Integrated Optical Touch Screen", Date: May 2003, SID 03 Digest, 4 pages, accessible at http://www.pianar.com/advantages/WhitePapers/docs/Pianar-AMLCD-Optical-Touch screen.pdf#search=%22%22Active%20Matrix%20LCD%20withf%20 INteg rated%.

Jefferson Y. Han, "Low-Cost Multi-Touch Sensing through Frustrated Total Internal Reflection", UIST'05, Date: Oct. 23-27, 2005, p. 115-118, Seattle, WA, accessible at http://deiivery.acm.org/10.1145/1100000/1095054/p115-han.pdf?

Office Action for U.S. Appl. No. 11/604,491, mailed Feb. 17, 2010, related to U.S. Appl. No. 11/693,670, title "Communication with a Touch Screen," 18 pages.

Office Action for U.S. Appl. No. 11/693,683, mailed Feb. 23, 2010, related to U.S. Appl. No. 11/693,670, title "Communication with a Touch Screen," 20 pages.

Office Action for U.S. Appl. No. 11/693,683, mailed Jun. 23, 2011, related to U.S. Appl. No. 11/693,670, title "Communication with a Touch Screen," 25 pages.

Office Action for U.S. Appl. No. 11/693,683, mailed Aug. 3, 2010, related to U.S. Appl. No. 11/693,670, title "Communication with a Touch Screen," 18 pages.

Office Action for U.S. Appl. No. 11/604,491, mailed Sep. 3, 2010, related to U.S. Appl. No. 11/693,670, title "Communication with a Touch Screen," 18 pages.

Office Action for U.S. Appl. No. 11/693,683, mailed Dec. 28, 2010, related to U.S. Appl. No. 11/693,670, title "Communication with a Touch Screen," 22 pages.

International Search Report and Written Opinion for PCT/US2008/058805, mailed Aug. 11, 2008, counterpart of U.S. Appl. No. 11/693,670, title "Communication with a Touch Screen," 12 pages.

International Search Report and Written Opinion, for PCT/US2008/058803, mailed Aug. 8, 2008, counterpart of U.S. Appl. No. 11/693,683, title "Communication with a Touch Screen," 11 pages.

Steve Klink, "Philips Research Press Release," Jan. 4, 2006, obtained from http://www.research.ph ilips.com/newscenter/archive/2006/060104-entert, 3 pages.

Office Action form U.S. Appl. No. 13/046,618, mailed Feb. 6, 2012, 19 pages.

Office Action for U.S. Appl. No. 13/046,481, mailed Feb. 7, 2012, 18 pages.

Non-Final Office Action for U.S. Appl. No. 13/313,700, mailed on Apr. 27, 2012, Shahram Izadi et al., "Touch Sensing Using Shadow and Reflective Modes", 24 pages.

* cited by examiner

COMMUNICATION WITH A TOUCH SCREEN

CROSS-REFERENCE TO RELATED APPLICATION(S)

This application is a continuation in part of U.S. utility application Ser. No. 11/604,491 entitled "Infrared sensor integrated in a touch panel" filed on Nov. 27, 2006, which is incorporated herein by reference.

BACKGROUND

Touch screens (or touch panels) are increasingly being used to provide user interfaces for devices such as tablet PCs, self-service terminals and mobile devices such as PDAs and mobile telephones. There are a number of different technologies which may be used, for example a resistive touch panel in which touching the screen causes layers, which are normally separated by a small gap, to come into contact or a capacitive touch panel in which contact with a conductive object changes the capacitance.

In another example, a touch screen may use optical sensors (e.g. an optical sensor array) to detect when a screen is touched. Use of optical sensors enables multi-touch sensing, i.e. detection of multiple simultaneous touches on the same screen. Such optical touch screens have two modes of operation: shadow mode and reflective mode. In shadow mode, the sensor detects the shadow which is cast by the object coming into contact with the screen. This mode of operation is affected by the level of ambient visible lighting and if it is too dark there may be no shadow and so the touch screen will fail to detect touch events. In reflective mode, the touch screen includes a light source (or illuminant) which illuminates objects which are brought into contact with the screen. The sensor detects the light reflected back by the objects. Where the touch screen includes an LCD screen, such that images can also be displayed on the screen, the image may affect the detection of objects because different color regions will allow different amounts of light to be transmitted through. This therefore affects how much of the illuminant reaches the object and also how much of the reflected light reaches the sensor.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A touch panel is arranged to enable communication using infrared signals with nearby devices. The touch panel includes an array of infrared sensors, arranged parallel to the touchable surface of the panel and at least one of the sensors is capable of detecting an infrared signal received from a nearby device.

In another embodiment, a touch panel is provided which includes an array of infrared sensors and at least one infrared source, where the source is arranged to transmit an infrared data signal to a nearby device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Use of infra-red sources, as described in U.S. utility application No. 11/604,491 entitled "Infrared sensor integrated in a touch panel" filed on Nov. 27, 2006, which is incorporated herein by reference, has the benefit that the graphic image displayed on the touch screen does not affect the detection of touch events. Additionally, the amount of ambient visible light does not affect the detection.

Figure 1:
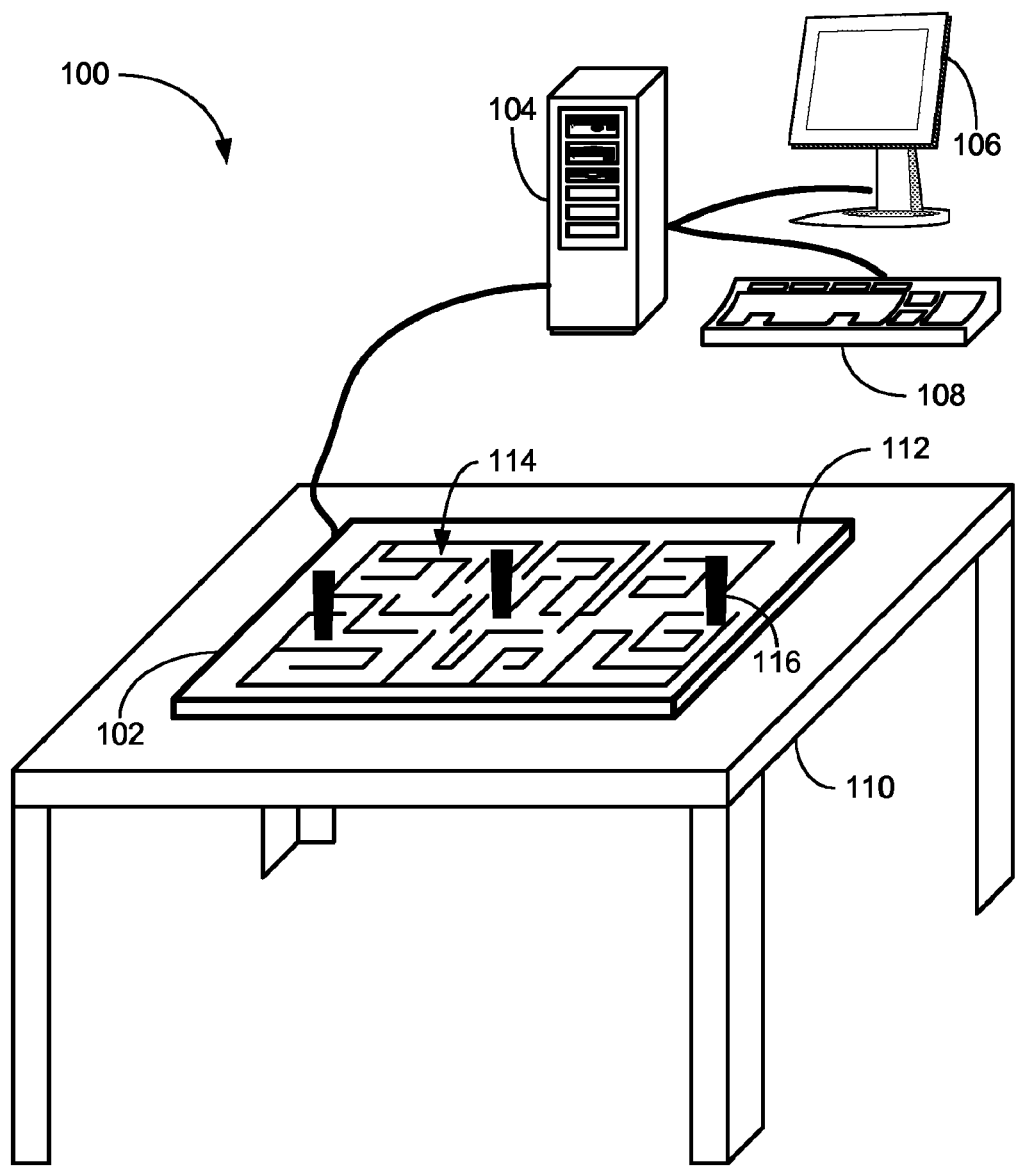
FIG. 1 illustrates an exemplary interactive display system incorporating a touch panel system.

FIG. 1 illustrates an exemplary interactive display system incorporating a touch panel system. An interactive display system 100 comprises a touch panel system 102 coupled to a computer 104. Computer 104 may be controlled via a monitor 106 and a keyboard 108 or any other suitable user interface. Touch panel system 102 is thin and is generally placed on a flat surface, such as the top of a table 110 or hanging from a wall. Touch panel system 102 comprises a touch panel and has a touchable surface 112. The touch panel is, in this example, also a display, and a graphic image 114 displayed by the display is viewable via touchable surface 112. In the example shown in FIG. 1, the graphic image 114 is that of a maze. Computer 104 provides processing power that yields a rich user interactive experience. As players move physical game pieces 116 around the maze, touch panel system 102 is able to detect the location of the game pieces, and to alter the displayed graphic image accordingly. For example, the walls of the maze may be moved to increase the complexity of the game, or a video clip may be shown if a game piece is placed on a certain location in the maze.

Infrared (IR) sources in system 102 illuminate the physical game pieces 116. IR radiation reflected from game pieces 116 is detected by IR sensors that are integrated into the touch panel. Signals from the IR sensors are processed by computer 104 to identify the locations of physical game pieces 116 on touchable surface 112. Any suitable method for distinguishing between different game pieces 116 on touchable surface 112 may be used. For example, physical game pieces 116 may have distinct shapes or may have symbols such as bar codes imprinted on their undersides.

For example, the touch panel comprises a plurality of retro-reflective opto sensors which operate in the infrared part of the spectrum. Each such opto sensor comprises two components: an infrared light emitter and an optically isolated infrared light sensor. It is therefore capable of both emitting light, and, at the same time, detecting the intensity of incident light. If a reflective object is placed in front of the sensing element, some of the emitted light will be reflected back and will therefore be detected.

Figure 2:
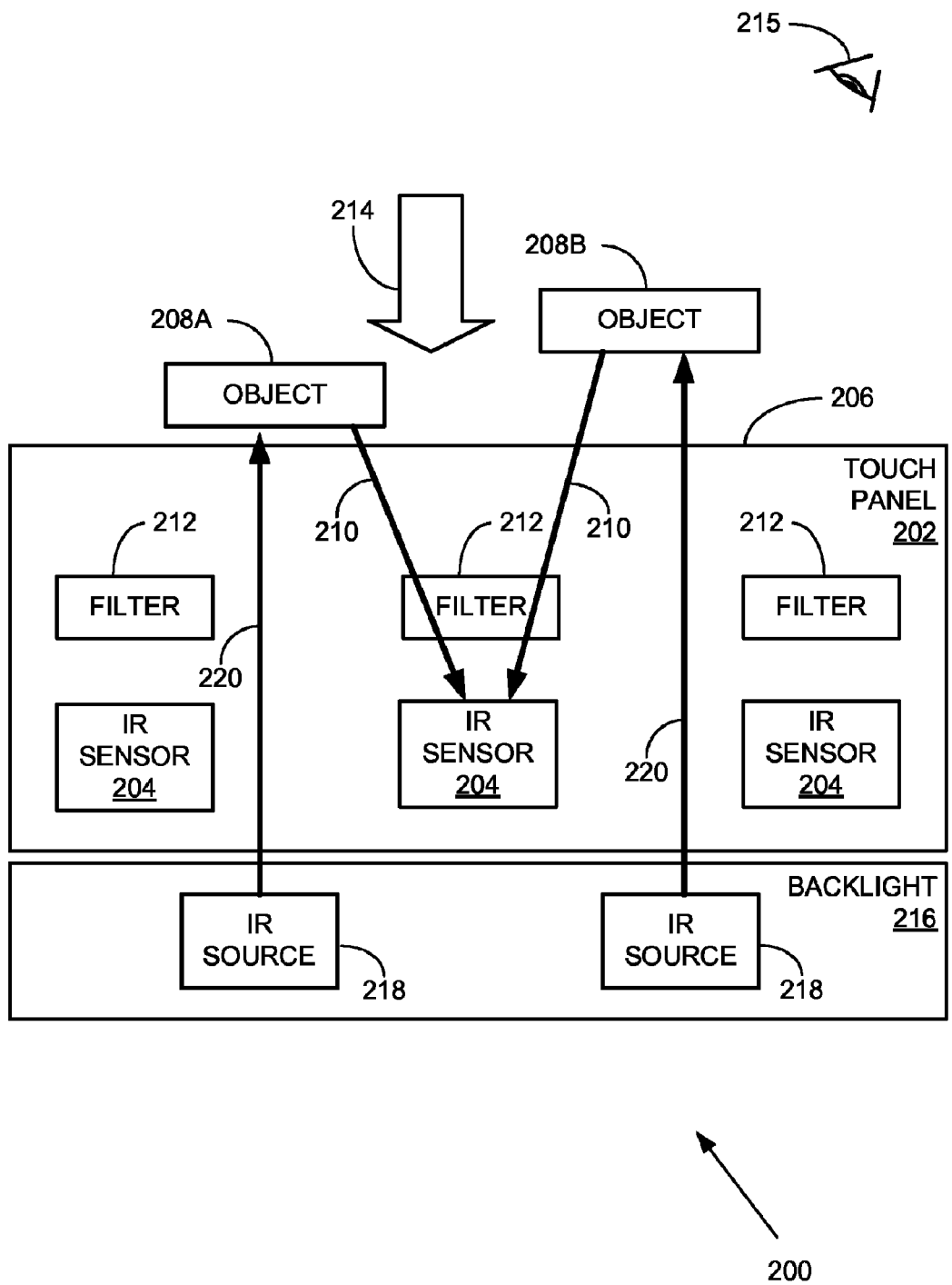
FIG. 2 illustrates a cross-section through an exemplary touch panel system.

FIG. 2 illustrates a cross-section of an exemplary touch panel system. A touch panel system 200 comprises a touch panel 202 that has several infrared (IR) sensors 204 integrated therein. Objects above a touchable surface 206 include an object 208A that is in contact with touchable surface 206 and an object 208B that is close to but not in actual contact with ("adjacent") touchable surface 206. Infrared sensors 204 are distributed throughout touch panel 202 parallel to touchable surface 206. One of infrared sensors 204 may detect infrared radiation reflected from objects 208A and 208B, as indicated by arrows 210. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be vertical. In that embodiment, the objects from which reflected IR radiation is detected are to the side of touchable surface 206. The term "above" is intended to be applicable to all such orientations.

Touch panel 202 may comprise filters 212 that absorbs visible light and transmits infrared radiation and are located between touchable surface 206 and IR sensors 204 in order to shield IR sensors 204 from visible light 214 incident on touchable surface 206 in the case where IR sensors 204 are sensitive to a broader range of wavelengths of light other than purely infrared wavelengths.

Touch panel 202 may comprise a display that is configured to display images that are viewable via touchable surface 206. An eye 215 indicates a possible direction from which the images are viewed. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent touchable surface 206 with infrared radiation through touchable surface 206, as indicated by arrows 220. IR sensor 204s are only sensitive to radiation incident from above, so IR radiation traveling directly from backlight 216 to IR sensor 204s is not detected.

The output of IR sensors 204 may be processed to identify a detected infrared image. The IR radiation reflected from the objects may be reflected from reflective ink patterns on the objects, metal designs on the objects or any other suitable reflector. For example, white paper reflects IR radiation and black ink absorbs IR radiation, so a conventional bar code on a surface of an object may be detected by an infrared-sensing device according to the described technology. Fingers are estimated to reflect about 10% of the near IR, which is sufficient to detect that a finger or hand is located at a particular location on or adjacent the touchable surface. A higher resolution of IR sensors may be used to scan objects to do applications such as document scanning and fingerprint recognition. For example, fingerprint recognition generally requires a resolution of more than 200 dots per inch (dpi).

FIG. 2 provides just one example of an exemplary touch panel system. In other examples, the backlight may not comprise any IR sources and the touch panel may include a frontlight which comprises at least one IR source. In such an example, the touchable surface of the system is a surface of the frontlight and not of the touch panel. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch panel may comprise an OLED display which comprises IR OLED emitters and IR-sensitive organic photosensors (which may comprise reverse-biased OLEDs).

In some touch panel systems, the touch panel may not comprise a display. Even if the touch panel comprises one or more components or elements of a display, the touch panel may be configured as to not display any images. For example, this may be the case when the input tablet is separate from the display. Other examples include a touchpad, a gesture pad, and similar non-display devices and components.

For some applications, it may be desirable to detect an object only if it is in actual contact with the touchable surface of the touch panel system. The IR source of the touch panel system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

IR sensors 204 may comprise suitable infrared-sensitive semiconductor elements. A non-exhaustive list of examples of semiconductor material that is infrared-sensitive includes polycrystalline silicon, monocrystalline silicon, microcrystalline silicon, nanocrystalline silicon, plastic semiconductors and other non-silicon based semiconductors. Devices based on polycrystalline, microcrystalline, monocrystalline or nanocrystalline silicon may have better stability than amorphous silicon devices. TFTs based on polycrystalline, microcrystalline, monocrystalline or nanocrystalline silicon may have higher field mobility than amorphous silicon TFTs.

Figure 3:
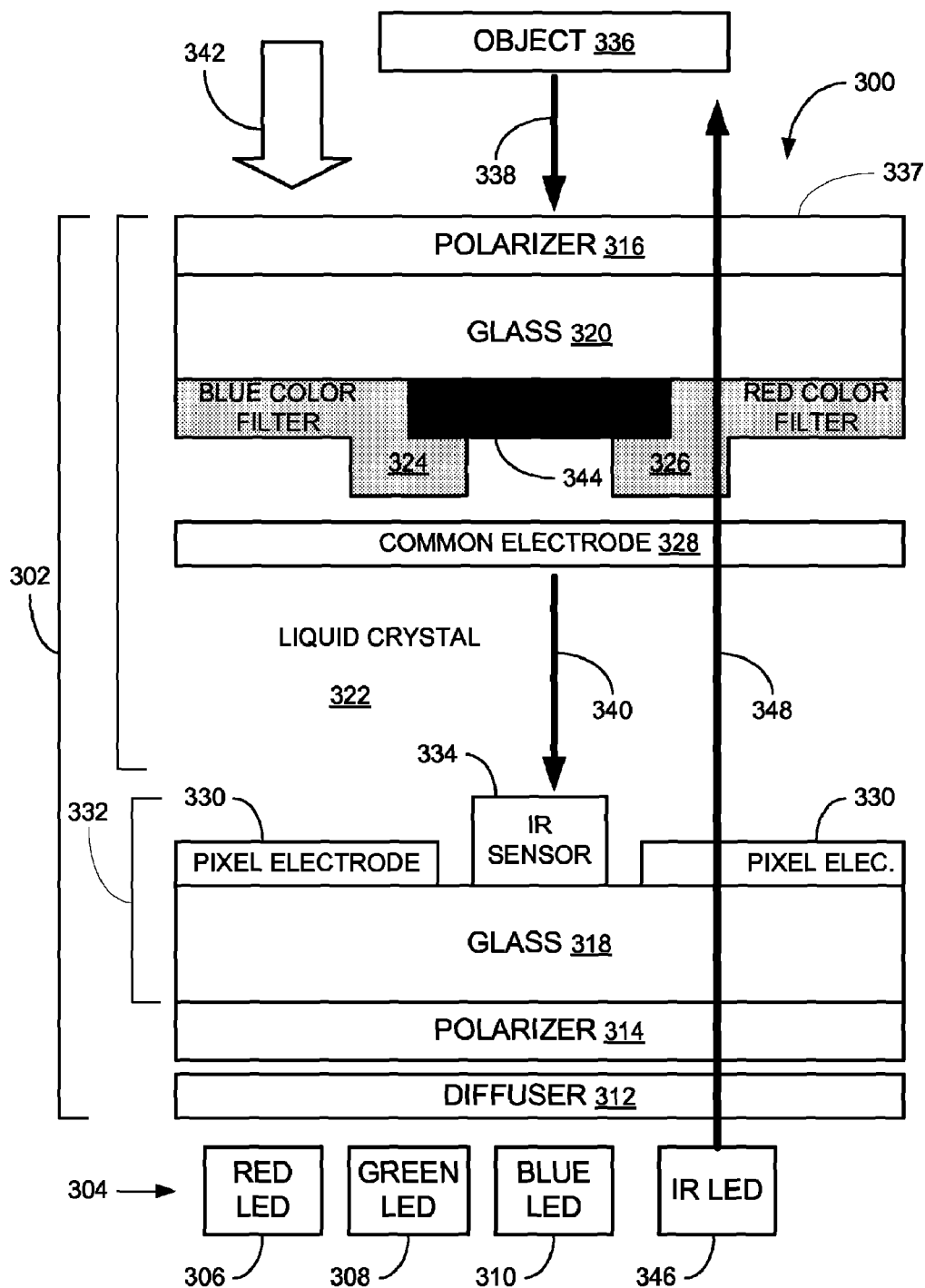
FIG. 3 illustrates a cross-section of an exemplary touch panel system having an exemplary liquid crystal display incorporated therein.

FIG. 3 illustrates a cross-section of an exemplary touch panel system having an exemplary LCD incorporated therein. A touch panel system 300 comprises a liquid crystal display 302 and a backlight 304. Backlight 304 comprises arrays of light-emitting diodes (LEDs). In a color backlight, red LEDs 306, green LEDs 308 and blue LEDs 310 may be used. Liquid crystal display 302 typically comprises a diffuser 312 to disperse the light from backlight 304 and obtain a more uniform intensity over the surface of the display.

LCD 302 comprises a pair of polarizers 314 and 316 separated by a pair of glass substrates 318 and 320, which in turn are separated by a layer of liquid crystal material 322 contained in a cell gap between substrates 318 and 320. In other implementations, substrates 318 and 320 may be constructed from another transparent material, for example, plastic. Color filters, for example, a blue color filter (CF) 324 and a red color filter 326, are adjacent the inner surface of substrate 320. Each color filter transmits only part of the visible spectrum.

In the example shown in FIG. 3, LCD 102 is an active matrix LCD. A continuous electrode 328, termed "common electrode", is located between the color filters and liquid crystal material 322. Electrode 328 is constructed using any suitable transparent electrode material, for example, indium tin oxide (ITO). Individual pixel electrodes 330 may be patterned from any suitable transparent electrode material, for example, ITO, and located on the inner surface of substrate 318. In a TFT active matrix LCD, substrate 318 includes TFTs which act as individual switches for each pixel electrode 330 (or group of pixel electrodes) corresponding to a pixel (or a group of pixels). The TFTs are described in further detail below with respect to FIG. 6. Pixel electrodes 330, the TFTs, and substrate 318 form a backplane 332 of LCD 302.

It is known, although not widely, that polarizers and color filters lose their function in the near infrared (IR) region of the spectrum. A sheet polarizer no longer polarizes electromagnetic waves at wavelengths larger than about 800 to 850 nm. Red, green and blue pigment color filters, typically used in LCDs, also transmit most of the wavelengths in the near infrared region of the spectrum. Hence, some near infrared light is transmitted through a conventional LCD, independent of the image displayed on the LCD display screen. For example, 40% of the near infrared light incident on one surface (front or back) of a conventional LCD may be transmitted through the LCD. The precise percentage of near infrared light transmitted through a particular LCD may depend on several factors, including, for example, the pixel aperture ratio and internal reflections in the cell.

LCD 302 comprises an IR sensor 334 integrated therein. As shown in FIG. 3, IR sensor 334 is integrated into backplane 332. Any IR light reflected from an object 336 in contact with or adjacent a touchable surface 337 of LCD 302 will be transmitted through polarizer 316, substrate 320, common electrode 328, liquid crystal material 322 and detected by IR sensor 334. An arrow 338 indicates the IR light reflected from object 336 and an arrow 340 indicates the IR light in liquid crystal material 322, the IR light possibly attenuated by polarizer 316, substrate 320, and common electrode 328.

IR sensor 334 may include, for example, a polycrystalline silicon TFT or photodiodes, a monocrystalline silicon TFT or photodiode, a microcrystalline silicon TFT or photodiode, or a nanocrystalline silicon TFT or photodiode. Infrared-sensitive semiconductor materials that are not based in silicon are also contemplated for elements of IR sensor 334.

In order to block visible light from reaching IR sensor 334, an IR-transmitting and visible-light absorbing filter may be integrated in LCD 302 opposite IR sensor 334. If such a filter is integrated in LCD 302, the susceptibility of the IR sensor to noise from ambient lighting 342, may be reduced. In the example shown in FIG. 3, the filter is an IR-transmitting polymer black matrix 344. In other examples, the filter may be comprised of two complementary color filters that are overlapping, for example, blue color filter 324 and red color filter 326. This implementation relies on the typical characteristics of visible light filters used in LCDs.

Backlight 304 comprises an IR source, which in this example is an IR LED 346. IR LEDs are commercially available at a low cost at a range of wavelengths, including, for example, peak emission wavelengths around 900 nm: 850 nm, 860 nm, 870 nm, 880 nm, 890 nm, 935 nm, 940 nm and 950 nm. At some of these wavelengths, high power versions of the IR LEDs are available. Infrared radiation from the IR source, indicated by an arrow 348, is transmitted through LCD 302 after being diffused by diffuser 312, if present. Some of the infrared radiation transmitted through LCD 304 is reflected off object 336 and detected by IR sensor 334 as described above.

As with FIG. 2, FIG. 3 provides just one example of an exemplary touch panel system having an exemplary liquid crystal display incorporated therein. In other examples, the backlight may not comprise an IR source and instead a frontlight external to an outer surface of polarizer 316 may be used. The frontlight may comprises an infrared light guide and an IR source coupled to light guide to direct the light away from the LCD towards the objects which are in proximity or contact with the touch surface. In another example, an IR source which emits polarized IR radiation may be used without a light guide and polarization filters and/or reflectors blocking that polarization may be provided between the frontlight and the LCD. IR light reflected off an object is not polarized, will pass through the polarization filters and/or reflectors, and be detected by an IR sensor. In other embodiments, the touch panel system could comprise an LCD with an active matrix frontplane, a passive matrix backplane or a passive matrix frontplane. Whilst the example of FIG. 3 shows an LCD with an IR-transmitting and visible-light absorbing filter between the touchable surface of the system and the IR sensor, in other embodiments, the LCD may lack such a filter.

Figure 4:
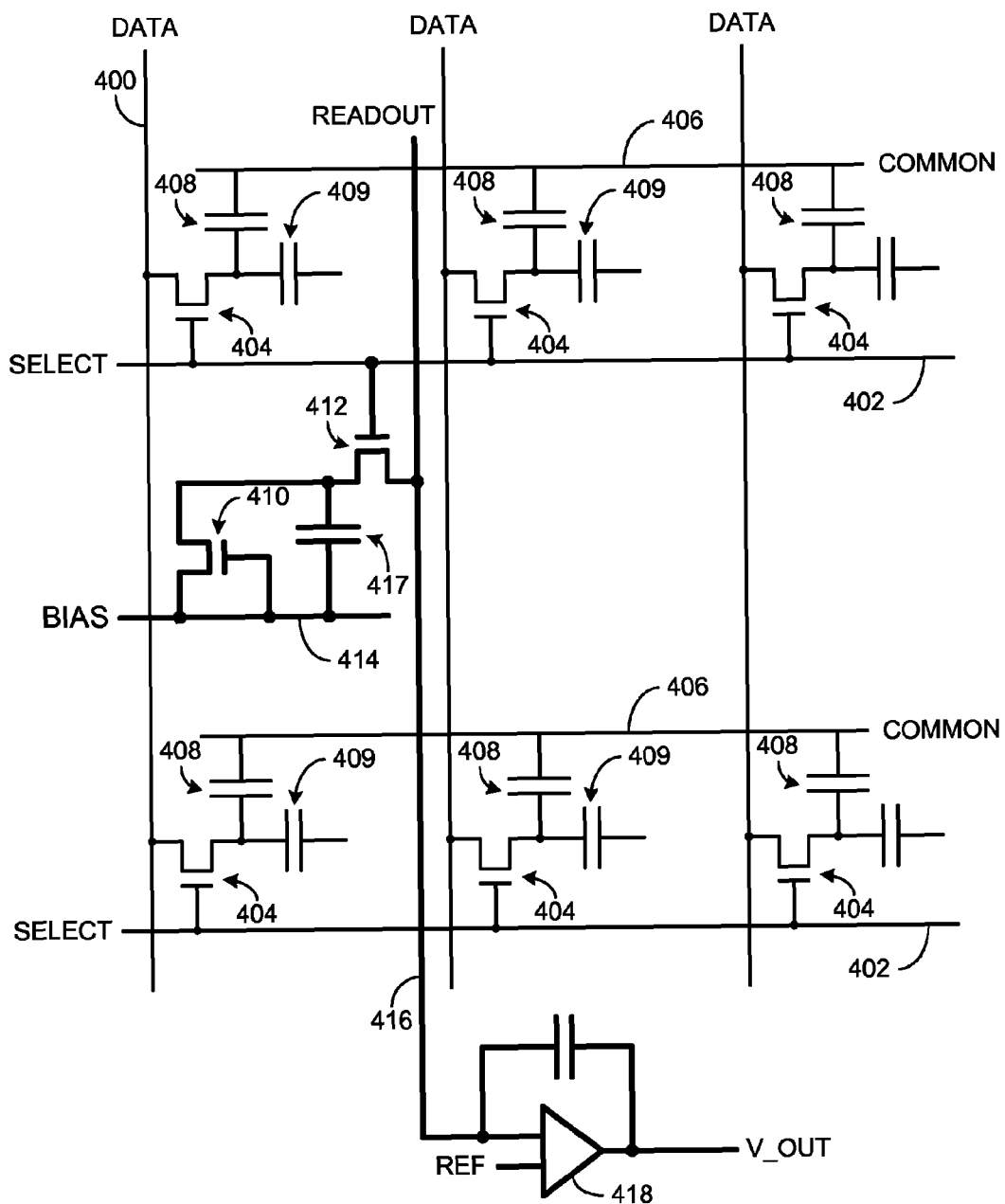
FIG. 4 illustrates an exemplary active matrix circuit having a TFT-based infrared sensor integrated therein.

FIG. 4 illustrates an active matrix circuit having a TFT-based infrared sensor integrated therein. As is known in the art, an active matrix layer comprises a set of data lines 400 and a set of select lines 402. An array of conductive lines may be created by including one data line for each column of pixels across the display and one select line for each row of pixels down the display. For each pixel, the active matrix layer also comprises a pixel TFT 404 capacitively coupled to a common line 406 through a capacitor 408. The source of pixel TFT 404 is coupled to its respective data line 400 and the drain of pixel TFT 404 is coupled to its respective select line 402. To load the data to the respective pixels indicating which pixels should be illuminated, normally in a row-by-row manner, a set of voltages are imposed on the respective data lines 400 which imposes a voltage on the sources of pixel TFTs 404. The selection of a respective select line 402, interconnected to the gates of pixels TFTs 404, permits the voltage imposed on the sources to be passed to drains of the pixel TFTs 404. The drains of the pixel TFTs are electrically connected to respective pixel electrodes. In addition, a respective capacitance exists between the pixel electrodes enclosing the liquid crystal material, noted as capacitances 409. Common line 406 provides a voltage reference. In other words, the voltage data (representative of the image to be displayed) is loaded into the data lines for a row of pixel TFTs 404 and imposing a voltage on select line 402 latches that data into the holding capacitors and hence the pixel electrodes.

To integrate an IR sensor into the liquid crystal circuit, the active matrix layer also comprises an infrared-sensitive TFT 410 interconnected to a readout TFT 412. The gate of readout TFT 412 may be interconnected to select line 402, and the drain and the gate of infrared-sensitive TFT 410 may be interconnected to a photobias line 414. (In other implementations, photobias line 414 and common line 606 may be one and the same.) The source of readout TFT 412 may be interconnected to a readout line 416. A capacitor 417 may interconnect photobias line 414 to the transistors. Readout line 416 is coupled to an operational amplifier 418 connected to a reference voltage. The TFTs may be addressed by a set of multiplexed electrodes running along the gaps between the pixel electrodes. Alternatively, the pixel electrodes may be on a different layer from the TFTs.

When a voltage is imposed on select line 402, this causes the voltage on readout line 416 to be coupled to the drain of infrared-sensitive TFT 410 and the drain of readout TFT 412, which results in a voltage potential across capacitor 417. The state of infrared-sensitive TFT 410 ("on" or "off") will depend on whether IR radiation is incident on infrared-sensitive TFT 410. For example, when a person touches the panel, the IR reflection off the finger (about 10%) will turn the infrared-sensitive TFT 410 partially "on". If infrared-sensitive TFT 410 is "off", the voltage imposed across capacitor 417 will not significantly discharge through infrared-sensitive TFT 410, and accordingly, the charge stored in capacitor 417 will be substantially unchanged. If infrared-sensitive TFT 410 is "on", the voltage imposed across capacitor 417 will significantly discharge through infrared-sensitive TFT 410, and accordingly, the charge stored in capacitor 417 will be substantially changed. To determine how much charge has leaked from capacitor 417, a voltage is imposed on select line 402. This turns on readout TFT 412 and a charge flows through readout line 416 to reset the charge on capacitor 417. The output voltage of operational amplifier 418 is proportional or otherwise associated with the charge needed to reset the voltage on capacitor 417 and is therefore a measure of the amount of IR radiation incident on infrared-sensitive TFT 410 during the preceding frame time. This output may be processed along with the output from other IR sensors in the circuit to identify a detected infrared image.

Infrared-sensitive TFT 410 and readout TFT 412, and the rest of the transistors in the active matrix layer, may comprise any suitable semiconductor material that is sensitive to infrared radiation, including polycrystalline silicon, monocrystalline silicon, microcrystalline silicon, nanocrystalline silicon, a plastic semiconductor material, and semiconductor materials that are not silicon-based.

For example, a microcrystalline silicon phototransistor can be manufactured with Plasma chemical vapor deposition (CVD) equipment on the same line as amorphous silicon TFTs. A large installed capacity is available for manufacturing a-Si TFT LCDs.

In another example the active matrix circuit may have a photodiode-based infrared sensor integrated therein. Such a circuit would differ from that of FIG. 4 in that an infrared-sensitive photodiode replaces the infrared-sensitive TFT 410. The photodiode would be interconnected to readout TFT 412, with the anode of photodiode interconnected to photobias line 414, and the cathode of photodiode interconnected to the drain of readout TFT 412. For example, the IR-sensitive photodiode may be a lateral PIN diode of polycrystalline silicon, and can be manufactured with a standard Low Temperature Poly Silicon Complementary Metal-Oxide Semiconductor (CMOS) process, which is common in the active matrix LCD industry.

A further exemplary active matrix circuit may have a TFT-based infrared sensor integrated therein. Such a circuit may comprise pixel circuits having two TFTs per pixel: a drive TFT and an access TFT. Each pixel circuit also comprises a storage capacitor and an OLED coupled to a common OLED electrode. The source of each access TFT is coupled to its respective data line and the drain of each access TFT is coupled to its respective select line. The access TFT is capacitively coupled to a common bias line through storage capacitor. There are many other variations of pixel circuits having two or more TFTs per pixel.

To integrate an IR sensor into the active matrix OLED circuit, the active matrix layer also comprises an infrared-sensitive TFT interconnected to a readout TFT in a similar manner to that shown in FIG. 4 and described above.

In another exemplary active matrix OLED circuit, an infrared-sensitive photodiode may replace the infrared-sensitive TFT.

The IR sensors in a touch panel system according to the described technology will also be sensitive to IR in the ambient radiation. Room light from incandescent lamps has a significant IR component. Likewise, in outdoor conditions, the solar spectrum at different times of the day includes IR radiation. It is known that the solar spectrum has a dip at about 920 nm. Therefore, IR sources emitting a peak wavelength at or near 920 nm may be used.

To improve signal-to-noise ratio in a touch panel system according to the described technology, the IR source may be pulsed in synchronization with the detection by the IR sensor. For example, for a sensor that integrates the signal during the frame time, the IR source(s) may be "on" during the odd frames and "off" during the even frames. This requires vertical scanning of the array of IR LEDs in the addressing direction of the rows. The differential signal between odd frames and even frames may cancel out the direct current (DC) noise from an IR background. The signal-to-noise ratio may also be improved by increasing the intensity of the IR source.

In addition to detection of touch events, the IR sources and/or sensors may be arranged to enable data communications between the screen and a nearby object. The communications may be uni-directional (in either direction) or bi-directional. The nearby object may be close to or in contact with the touch surface, or in other examples, the nearby object may be at a short distance from the touch screen (e.g. of the order of meters or tens of meters rather than kilometers).

Figure 5:
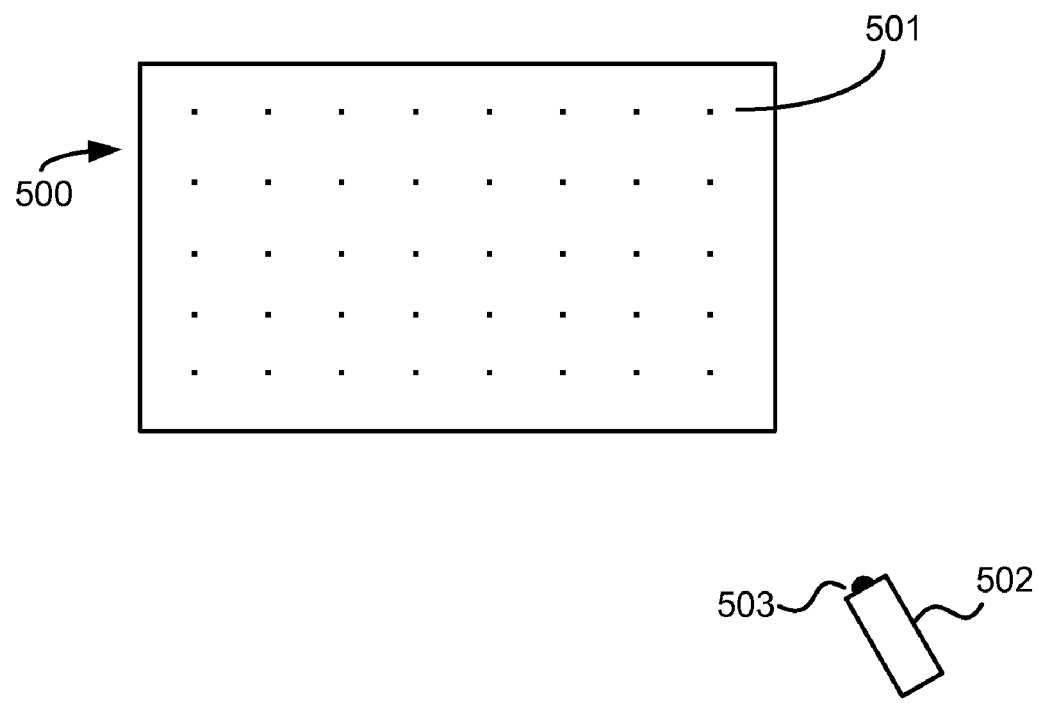
FIG. 5 is a schematic diagram of a first example of a touch panel system capable of communication with a nearby device.
Figure 6:
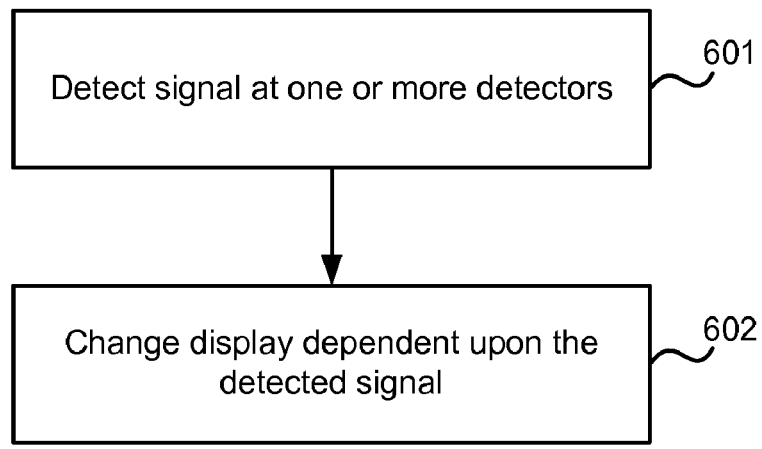
FIG. 6 is an exemplary flow diagram of a method of operation of the system of FIG. 5.

In a first example, as shown on FIG. 5, the touch panel 500, which may comprise an array of infra-red detectors 501 (e.g. IR sensitive TFTs or IR-sensitive photodiodes), may receive an IR signal from a nearby device 502 including an IR transmitter 503. The operation, as shown in FIG. 6 involves the detection of the signal at one or more of the detectors (block 601) and changing the display dependent upon the detected signal (block 602). The display may be changed (in block 602) in many different ways, for example:

Display of a pointer icon on the touch panel dependent on the position of the detector receiving the signal. This provides a pointer system for use with a touch panel. This system may be used in many applications including presenting, gaming etc.

Changing the user interface (UI) according to the detected pointing parameters (e.g. location, modulation scheme etc, as described in more detail below). This enables the movement of the device 502 (e.g. when the user gestures or points) to be used to control the images/data displayed, navigation through various windows of a UI etc. Controlling the application running on the display system according to the pointing parameters.

The signal transmitted by the nearby device 502 may use any suitable protocol, such as the standard TV remote control protocol or IrDA. The shape of the beam projected by the nearby device may be controlled (e.g. a circle, square or cross-shaped) and may be fixed or variable. The change to the display (e.g. the pointed icon displayed) may be dependent upon the shape detected and/or any other parameter detected in relation to the IR signal (e.g. the modulation scheme used, as described in more detail below). The shape detected may also be used to determine the location of the person holding the device with respect to the touch panel and where a cross-hair is used, the rotation of the device may be determined. This may enable the image displayed to change based on the user's location or an aspect of the game to be controlled based on the detected pointing parameters (e.g. shape, modulation scheme etc).

Aspects of the detected signal may, in some examples, be used to calibrate the response to signals received. For example, the intensity of the detected signal may be used to determine the approximate distance between the device 502 and the touch panel 500 and the response to detected signals (in block 602) may be changed based on this determination. In an example, where the touch panel system detects gestures, the size of the expected gesture may be normalised based on the determined distance between the device and the touch panel.

In order that the display can distinguish multiple pointing events substantially simultaneously, different devices may use different beam shapes, different wavelengths or different modulation (e.g. amplitude modulation) schemes. In an example, the signal may be modulated according to an identifier associated with the device (e.g. a Bluetooth MAC address) such that the information may be used to identify the device and for subsequent communication (e.g. by Bluetooth in this example).

In a further example, different pointing events may be distinguished using spatial multiplexing. In this example, the detected signal from multiple detectors may be analyzed (e.g. using a computer vision system) to determine whether two beams are being received (e.g. because there are two spatially separated groups of detectors which are detecting the signal or the shape detected is a partially overlapping combination of two known beam shapes). In another example, different nearby devices 502 may be allocated different time slots for transmission of a pulsed IR signal (i.e. time division multiplexing) or different wavelengths may be used.

Such a device 502 may provide a user interface device for the touch panel. The touch panel may be arranged to interpret the detected shapes as user inputs (e.g. rotation of cross-hairs, gestures etc) and thereby control an application running on the display (e.g. use of gestures to move items between different displays). This may be combined with data communications between the touch panel and the device (e.g. if a user presses a button on the device) and this is described in detail below. Such a device, may for example, provide a games controller and the detection of multiple pointing events, as described above, may provide means for multiple players to interact with the game via the touch panel substantially simultaneously. In an example, the nearby devices may comprise games controllers and the detection of multiple pointing events may enable a multiplayer shooting game to be played on the touch panel system.

In addition to having an IR transmitter 503, the device 502 may also comprise a visible transmitter (not shown in FIG. 6) such as a visible laser or LED. In such an example, the visible transmitter may be used for pointing and the IR transmitter may be used for data communications to control the application which is running. The application may be a presentation application (such as Microsoft PowerPoint (trade mark), a game or any other application.

Figure 7:
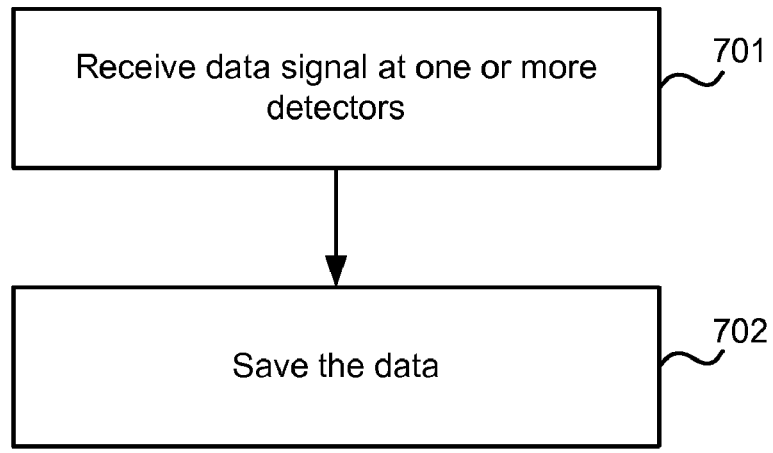
FIG. 7 is a second exemplary flow diagram of a method of operation of the system of FIG. 5.

In a second example of communications with a touch panel using IR, the signal received (e.g. from nearby device 502) may comprise data (encoded in a modulated signal), rather than being a pointer signal. As shown in FIG. 7, the modulated IR signal which comprises data may be received at one or more of the sensors 501 in the touch panel (block 701) and then stored (block 702). In order that data may be received from more than one device substantially simultaneously, spatial, frequency or time division multiplexing may be used in a similar manner to detection of multiple pointing events, as described above. As described above, any suitable protocol may be used, such as IrDA.

Figure 8:
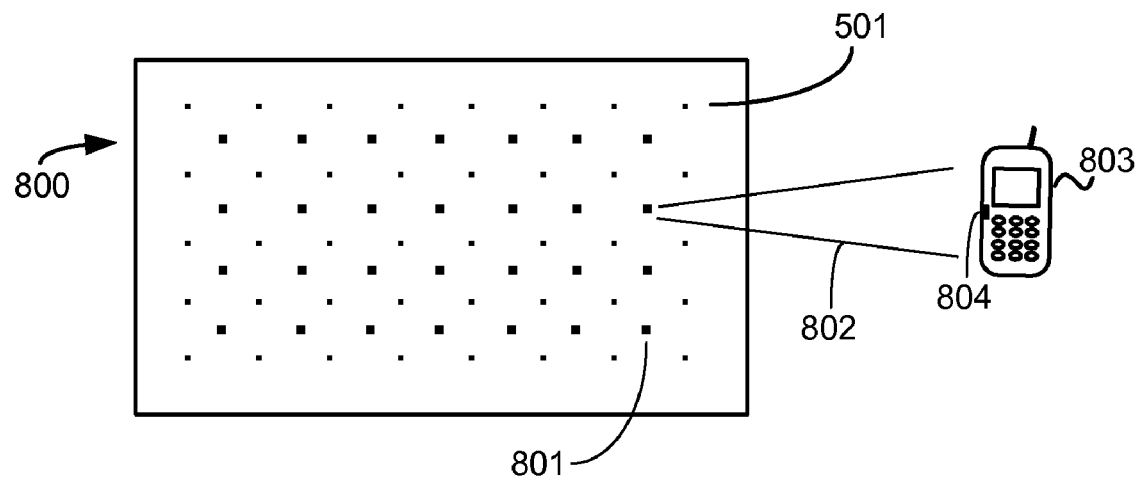
FIG. 8 is a schematic diagram of a second example of a touch panel system capable of communication with a nearby device.

In addition to, or instead of, receiving data from a nearby device, the touch panel may transmit data to one or more nearby devices, as shown in the schematic diagram of FIG. 8. The touch panel 800 comprises, in addition to an array of IR sensitive detectors 501, one or more IR sources 801 which may be used to illuminate nearby objects for use in reflective mode (as described above). One or more of the IR sources 801 may be used to transmit data (indicated by beam 802) to a nearby electronic device 803 equipped with an IR receiver 804 or a dedicated IR source may be provided for data transmission. The data may be broadcast such that all electronic devices which are within range can receive the data, or alternatively the data may be transmitted using different modulation schemes, or multiplexing techniques (e.g. spatial, frequency or time) in order to transmit different data to different devices.

In some examples, a DC-balanced encoding scheme is used for data transmission between the touch panel and one or more nearby devices. This data transmission is modulated at a rate faster than that required by the touch panel to detect a specified type of touch event, such as a fingertip touch. In this way, the touch panel is able to carry out data transmitting substantially simultaneously with touch event detection.

In some examples, the touch panel system is arranged to detect the outline of a nearby electronic device (such as 502 of FIG. 5) either in shadow mode or reflective mode. This enables the touch panel system to detect the presence of the nearby electronic device and to "expect" possible data communication with that nearby device. For example, the touch panel system may be arranged to switch at least some of the sensors within the detected outline into data communications mode.

Whist the nearby devices in FIGS. 5 and 8 are depicted as a pointing device 502 and a mobile telephone 803 this is by way of example only and the touch panel may communicate with any nearby device comprising an IR transmitter and/or receiver. The devices may be located close to or in contact with the touch panel (e.g. intelligent game pieces) or at a distance from the touch panel (e.g. laptop or desktop computer, PDA, games console, games controller, light controller etc).

The data transferred between a nearby device and the touch panel may be of any kind, including data for display on the touch panel, such as images captured on a digital camera (which may, for example, be integrated within a mobile telephone or PDA). In another example, the data transferred may be an identifier (e.g. the ID of a pointing device or the identifier for a particular data set which should be displayed on the touch panel). In an example, an identifier for a particular data set may be transmitted from the touch panel to a nearby device and then a gesture may be used to transfer that data set to another touch panel display system.

In order to reduce the power consumption of the touch panel, the touch panel may only scan a subset of the sensors 501 and upon detection of a signal (e.g. in block 601 of FIG. 6), the panel may scan all the sensors 501 in order to determine the full parameters of the signal (e.g. to determine the aspects of any gesture in detail).

Figure 9:
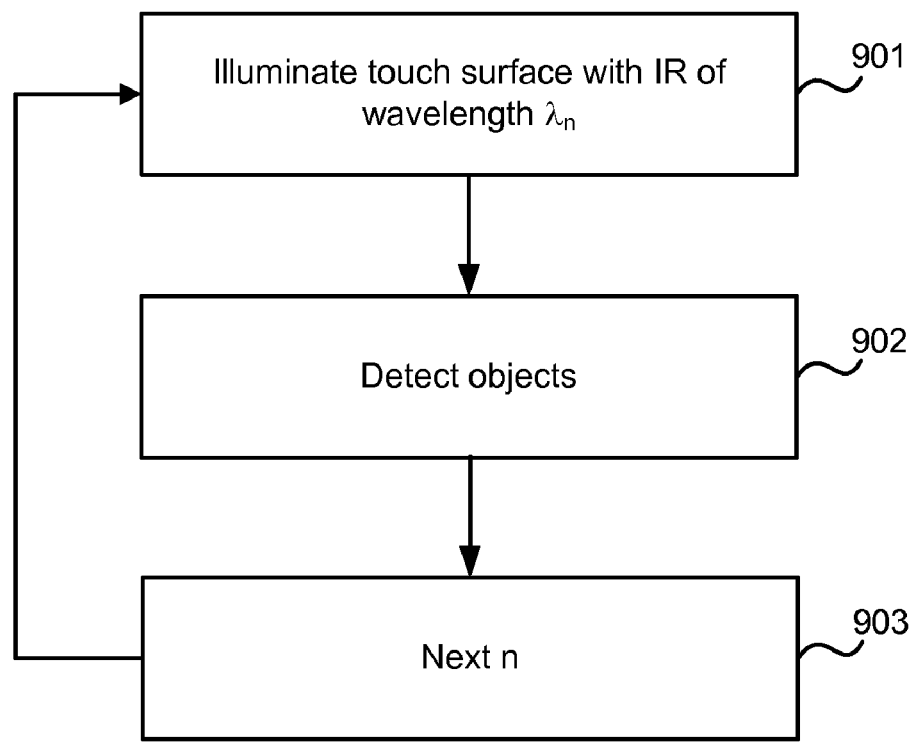
FIG. 9 shows an example flow diagram of a method of receiving data from passive devices in proximity to the touch panel.

Whilst the above examples relate to active objects which communicate with the touch panel display system, in some examples, passive objects may be used for communication. Such passive objects may comprise a wavelength selective tag or label, which may then be read using different wavelengths of IR (e.g. 850 nm, 980 nm or more closely spaced wavelengths), as shown in the example flow diagram of FIG. 9. The touch surface is illuminated with IR of wavelength $\lambda_n$ (block 901) and the reflected signal detected and analyzed to identity any objects (block 902). The process is then repeated for the next wavelength (blocks 903, 901, 902) etc. In some examples, a combination of detection of the shape and the wavelength of the tag may be used to distinguish between objects (in block 902).

The wavelength selective tag may be in the form of a coating on part of or the entire surface of the object which is in contact with the touch panel system. The tag may, for example, comprise a holographic film, a Bragg grating, a wavelength-selective thin film or any other wavelength-selective reflector.

In order to use such wavelength selective reflectors to distinguish between objects or to read information, the touch panel may comprise IR sources of different wavelengths (e.g. a first array emitting IR wavelength $\lambda_1$ and a second array emitting IR wavelength $\lambda_2$). When IR sources of a first wavelength, $\lambda_1$, are turned on (in block 901), bright reflections will be detected (in block 902) from those objects having a tag which reflects that wavelength and when IR sources of a second wavelength, $\lambda_2$, are turned on (block 903, then block 901), bright reflections will be detected (in block 902) from those objects having a tag which reflects the second wavelength. As described earlier, the touch panel may in some examples not comprise an array of sources but instead one or more IR sources of each wavelength may be used in combination with a light guide. In another example, the touch panel may comprise one or more tunable IR sources (e.g. a tunable LED or a tunable laser) and the objects may be detected and distinguished by scanning the wavelength of the tunable source.

The objects may, for example, be gaming pieces, physical user interface (UI) devices, such as dials, sliders etc, identity tags for users (e.g. to log in a user may place his/her tag on the touch panel, where the user is identified by the wavelength of the wavelength-selective tag, or the tag in combination with other distinguishable features) or any other object. In some examples, additional data may be encoded within the tag such as an identifier.

Whilst in the example above, the tags on objects may be selective using wavelength, in other examples other optical properties may be used to provide wavelength selective tags, such as the angle of illumination (e.g. by powering different sources, moving sources etc), intensity or polarization of the illuminant. The tag may comprise a holographic film, a thin light pipe or any suitable selective reflector.

Figure 10:
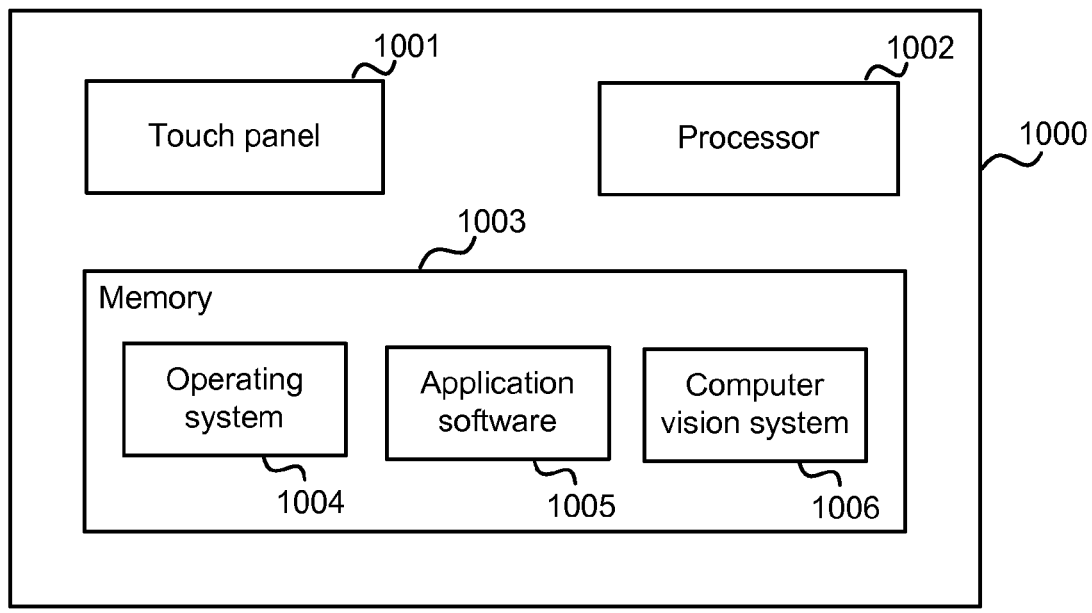
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods and apparatus described above may be implemented.

Computing-based device 1000 comprises a touch panel 1001, for example as described above and shown in any of FIGS. 2, 3, 6 and 7, and one or more processors 1002. The one or more processors may be microprocessors, controllers or any other suitable type of processors for processing computing executable instructions to control the operation of the device in order to detect multiple touch/pointing events and/or to transmit or receive data to/from a nearby device. The computer executable instructions may be provided using any computer-readable media, such as memory 1003. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

Platform software comprising an operating system 1004 or any other suitable platform software may be provided, and stored in memory 1003, to enable application software 1005 to be executed on the device. The application software may include a computer vision system application 1006.

The computing-based device may also comprise one or more inputs which are of any suitable type for receiving media content, Internet Protocol (IP) input, user instructions from a user input device etc, a communication interface and one or more outputs such as an audio output.

Although the present examples are described and illustrated herein as being implemented in an IR based system, the system described is provided as an example and not a limitation. As those skilled in the art will appreciate, the present examples are suitable for application in a variety of different systems which may use different wavelengths of electromagnetic radiation (e.g. visible light). In addition, instead of using the arrangement of IR sources described above, the touch panel may use FTIR (frustrated total internal reflection) where the IR source emits a beam parallel to the touch surface and the IR sensors detect a drop in intensity.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
    detecting a signal at one or more of an array of infrared sensors associated with a touch panel;
    detecting a plurality of parameters of the signal, wherein at least a first parameter includes a shape of the signal that distinguishes a device from a plurality of devices within a proximity to the touch panel and at least a second parameter includes an intensity of the signal;
    using time division multiplexing, allocating a time period to the device such that the touch panel is configured to receive one or more data transmissions solely from the device during the time period;
    during the time period, determining a physical location of the device with respect to the touch panel and a distance between the device and the touch panel based at least in part on the shape of the signal and the intensity of the signal;
    detecting a gesture associated with movement of the device within the proximity to the touch panel;
    normalizing the gesture based at least in part on the physical location of the device and the distance between the device and the touch panel; and
    changing a display on the touch panel based at least in part on the normalized gesture.

2. A method according to claim 1, wherein changing the display on the touch panel comprises:
    displaying an icon on the touch panel dependent upon a location of the one or more of the array of infrared sensors.

3. A method according to claim 1, wherein changing the display on the touch panel comprises:
    controlling an application running on the touch panel.

4. A method according to claim 3, wherein the signal comprises data and the application is a multi-user application, the method further comprising:
    saving the data; and
    controlling the multi-user application in accordance with the saved data.

5. A method comprising:
    detecting a signal at one or more of an array of infrared sensors associated with a touch panel;
    determining at least one parameter of the signal, wherein the at least one parameter includes a shape of the signal that distinguishes a device from a plurality of devices within a proximity to the touch panel;
    identifying the device from the plurality of devices based on the shape of the signal;
    using time division multiplexing, allocating a time period to the device such that the touch panel is configured to receive one or more data transmissions solely from the device during the time period;
    during the time period, determining a physical location of the device with respect to the touch panel and a distance between the device and the touch panel based at least in part on the shape of the signal;
    detecting a gesture associated with movement of the device within the proximity to the touch panel;
    normalizing the gesture based at least in part on the physical location of the device and the distance between the device and the touch panel; and
    controlling an application currently being displayed on the touch panel based at least in part on the normalized gesture.

6. A method according to claim 5, wherein controlling the application currently being displayed on the touch panel comprises displaying an icon on the touch panel.

7. A method according to claim 5, wherein the signal comprises data and the application is a multi-user application, the method further comprising:
    saving the data; and
    controlling the multi-user application in accordance with the saved data.

8. A touch panel system comprising:
    one or more processors; and
    a memory storing instructions that, when executed by the one or more processors, perform operations comprising:
        detecting a signal at one or more of an array of infrared sensors associated with a touch panel;
        determining at least one parameter of the signal, wherein the at least one parameter includes an intensity of the signal;
        identifying a device from a plurality of devices based on the intensity of the signal;
        using time division multiplexing, allocating a time period to the device such that the touch panel is configured to receive one or more data transmissions solely from the device during the time period;
        during the time period, determining a physical location of the device with respect to the touch panel and a distance between the device and the touch panel based at least in part on the intensity of the signal;
        detecting a gesture associated with movement of the device within a proximity to the touch panel;

normalizing the gesture based at least in part on the physical location of the device and the distance between the device and the touch panel; and controlling an application currently being displayed on the touch panel based at least in part on the normalized gesture.

9. A touch panel system according to claim 8, wherein controlling the application currently being displayed on the touch panel comprises displaying an icon on the touch panel.

10. A touch panel system according to claim 8, wherein the signal comprises data and the application is a multi-user application, the instructions further performing operations comprising:

saving the data; and controlling the multi-user application in accordance with the saved data.

* * * * *